(12) United States Patent
Russchen et al.

(10) Patent No.: US 11,780,716 B2
(45) Date of Patent: Oct. 10, 2023

(54) LIFTING COLUMN ENABLING WHEEL ACCESS FOR LIFTING A VEHICLE, LIFTING SYSTEM COMPRISING SUCH LIFTING COLUMN AND A CORRESPONDING METHOD FOR LIFTING A VEHICLE

(71) Applicant: Stertil B.V., Kootstertille (NL)

(72) Inventors: Albert Thaeke Russchen, Sneek (NL); Jan Bernhard Stapensea, St. Annaparochie (NL)

(73) Assignee: Stertil B.V., Kootstertille (NL)

(*) Notice: Subject to any disclaimer, the term of this patent is extended or adjusted under 35 U.S.C. 154(b) by 100 days.

(21) Appl. No.: 17/244,074

(22) Filed: Apr. 29, 2021

(65) Prior Publication Data
US 2021/0339991 A1  Nov. 4, 2021

(30) Foreign Application Priority Data

May 1, 2020   (NL) .................................... 2025478
Jul. 21, 2020  (NL) .................................... 2026109

(51) Int. Cl.
*B66F 3/46*   (2006.01)
*B60B 29/00*  (2006.01)
(Continued)

(52) U.S. Cl.
CPC .............. *B66F 3/46* (2013.01); *B60B 29/001* (2013.01); *B60B 30/02* (2013.01); *B66F 3/36* (2013.01);
(Continued)

(58) Field of Classification Search
CPC ................................ B66F 3/46; B60B 29/001
(Continued)

(56) References Cited

U.S. PATENT DOCUMENTS 3,532,239 A * 10/1970 Pierluigi ................... B66F 9/16
                                                    414/642
5,368,435 A * 11/1994 Bostad ..................... B66F 9/148
                                                    414/667
(Continued)

FOREIGN PATENT DOCUMENTS

AU      2008101096 A4   12/2008
CA      2836301 C     * 10/2019  ............. B60B 29/00
(Continued)

OTHER PUBLICATIONS

Mikio Mori Publication: Apr. 13, 2017 retrieved translation from: https://patents.google.com/patent/JP2017071228A/en?oq=JP2017071228+A.*
(Continued)

*Primary Examiner* — Lee D Wilson
*Assistant Examiner* — Christopher Soto
(74) *Attorney, Agent, or Firm* — THE WEBB LAW FIRM (57) ABSTRACT

The present invention relates to a lifting column and a first and second mast for lifting a vehicle, a lifting system including one or more of these lifting columns and a method for lifting a vehicle. The lifting column according to the invention includes a frame provided with a first mast and a second mast; at least one carrier configured for engaging the vehicle, with the at least one carrier moveable relative to the first and second mast; and a lifting mechanism with a drive for moving the at least one carrier and lifting the vehicle. The first and second mast are positioned on the frame at a mast distance, with the mast distance enabling access to a wheel of the vehicle.

18 Claims, 10 Drawing Sheets

(51) Int. Cl.
  *B60B 30/02* (2006.01)
  *B66F 3/36* (2006.01)
  *B66F 3/44* (2006.01)

(52) U.S. Cl.
  CPC ............ *B66F 3/44* (2013.01); *B60B 2340/30* (2013.01); *B60B 2340/70* (2013.01)

(58) Field of Classification Search
  USPC ..... 269/17; 254/3 B, 4 B, 6 B, 8 R, 8 C, 9 B
  See application file for complete search history.

(56) References Cited

U.S. PATENT DOCUMENTS

| | | | | |
|---|---|---|---|---|
| 8,282,075 | B2 * | 10/2012 | Chan | B66F 9/18 |
| | | | | 254/2 B |
| 8,887,929 | B2 * | 11/2014 | Erlenbach | A47F 5/0006 |
| | | | | 248/690 |
| 9,868,621 | B2 * | 1/2018 | Jaipaul | B66F 3/46 |
| 10,076,931 | B2 * | 9/2018 | Finkbeiner | B66F 3/46 |
| D874,081 | S | 1/2020 | De Jong | |
| 2006/0182563 | A1 | 8/2006 | De Jong et al. | |
| 2009/0158570 | A1 * | 6/2009 | Morey | B66F 3/36 |
| | | | | 29/252 |
| 2016/0052757 | A1 | 2/2016 | De Jong | |
| 2017/0313561 | A1 * | 11/2017 | Horimizu | B66F 7/28 |

FOREIGN PATENT DOCUMENTS

| | | | |
|---|---|---|---|
| CH | 407472 A | | 2/1966 |
| JP | 2017071228 A | * | 4/2017 |
| WO | 2020009571 A1 | | 1/2020 |

OTHER PUBLICATIONS

Hedley Publication: Oct. 15, 2019 retrieved translation from: https://patents.google.com/patent/CA2836301C/en?oq=CA+2836301+C.*

* cited by examiner

LIFTING COLUMN ENABLING WHEEL ACCESS FOR LIFTING A VEHICLE, LIFTING SYSTEM COMPRISING SUCH LIFTING COLUMN AND A CORRESPONDING METHOD FOR LIFTING A VEHICLE

CROSS-REFERENCE TO RELATED APPLICATIONS

This application claims priority to The Netherlands Patent Application Nos. 2025478 filed May 1, 2020 and U.S. Pat. No. 2,026,109 filed Jul. 21, 2020, the disclosures of which are hereby incorporated by reference in their entirety.

BACKGROUND OF THE INVENTION

Field of the Invention

The invention relates to a lifting column, more specifically a mobile vehicle lifting column. Lifting columns are used for lifting passenger cars, trucks, busses, or other vehicles. The lifting column is often incorporated in a lifting system comprising one or more of these lifting columns.

Description of Related Art

Conventional lifting columns comprise a frame with a carrier that is connected to a drive for moving the carrier upwards and downwards along a mast of the frame. In the ascent mode, hydraulic oil is pumped to a cylinder for lifting the carrier and, therefore, lifting the vehicle. In the descent mode, the carrier with the vehicle is lowered and hydraulic oil returns to the reservoir. For example, such prior art lifting column is disclosed in U.S. patent application publication No. 2006/0182563, which is incorporated herein by reference.

A problem with conventional lifting columns is that these columns restrict wheel access. This can be problematic in case of wheel replacement, wheel hub motor maintenance, and brake drum maintenance, for example. These vehicle operations require several steps that need to be performed by an operator/mechanic. The steps include positioning of the lifting column relative to the vehicle, lifting the vehicle with a set of lifting columns. After lifting the vehicle an axle support is positioned, and the vehicle is lowered to engage the axle support. This allows for removal of the (mobile) lifting column. This provides access to the vehicle wheel. Mostly a so-called wheel dolly needs to be positioned to enable dismounting a wheel from the vehicle. The wheel can be lowered and removed from the vehicle using the wheel dolly. In case of a wheel change the new wheel will be provided to the vehicle using the wheel dolly that enables assembling the wheel to the vehicle. After mounting the wheel the wheel dolly is removed, the mobile lifting column is repositioned. After removal of the axle support the vehicle can be lowered and the mobile lifting column carries the vehicle. This requires a lot of steps for the operator/mechanic to be performed and is therefore relatively time consuming. Furthermore, different types of equipment are required during the lifting operation that require movement. This constitutes a safety risk.

SUMMARY OF THE INVENTION

The present invention has for its object to obviate or at least reduce one or more of the above stated problems.

For this purpose the present invention provides a lifting column for lifting a vehicle, wherein the lifting column comprises:
- a frame provided with a first mast and a second mast;
- at least one carrier configured for engaging the vehicle, wherein the at least one carrier is moveable relative to the first and second mast;
- a lifting mechanism with a drive for moving the at least one carrier and lifting the vehicle, wherein the first and second mast are positioned on the frame at a mast distance, and wherein the mast distance enables access to the wheel.

In the context of the present invention the carrier relates to the moving parts of the lifting column that carry the vehicle when lifting this vehicle. This carrier is driven by a drive, such as a hydraulic drive, pneumatic drive and/or electric drive. The present invention relates to lifting columns, preferably mobile lifting columns, and more preferably to wireless mobile lifting columns.

The carrier of the lifting column is capable of carrying the vehicle that needs to be lifted. The carrier moves upwards and downwards relative to the frame and more specifically the mast(s) of the lifting column with the drive. The carrier comprises a carrying part that is configured for carrying of vehicle, or at least a part thereof. The carrier further comprises a guiding part that enables a guiding movement of the carrier relative to the frame and more specifically the mast(s) of the lifting column. In one of the presently preferred embodiments of the invention the drive is embodied as an integrated hydraulic cylinder as disclosed in U.S. patent application publication No. 2016/0052757. Preferably, the carrying part is one piece and moves relative to the first and second masts with the use of one or two guiding parts. It will be understood that other configurations for the carrier can also be envisaged according to the invention including a two-piece carrying part, for example.

According to the invention the frame is provided with a first mast and the second mast. These first and second masts typically extend in a substantially vertical direction enabling guidance of the carrier with the guiding part(s) thereof. The lifting mechanism with the aforementioned drive is configured for moving the at least one carrier along the first and second masts and thereby enabling lifting the vehicle.

Providing the first and second masts at a mast distance enables access to the wheel of the vehicle. The mast distance is defined by the distance between the mast sides that define the opening between the masts for wheel access. Preferably, the mast distance is in the range of 30-120 cm, more preferably 40-80 cm, and most preferably in the range of 40-70 cm.

The mast distance enables wheel access such that repair, maintenance and exchange of parts can be performed more easily. In addition, the safety risks associated with lifting a vehicle and performing maintenance are significantly reduced.

The lifting column according to the present invention enables a lifting operation with a reduced number of steps and provides a safer working environment. Steps include the positioning of the lifting column and lifting the vehicle. For removal of a vehicle wheel or wheel hub motor an axle support is positioned. Preferably, in case of a wheel change the wheel is dismounted from the vehicle after which the lifting column is lowered and the vehicle is supported by the axle support. The lifting column can be used to move the wheel and to provide a replacement wheel, for example. The lifting column is preferably used to lift the new parts, such as the new wheel, and position the wheel relative to the vehicle to enable mounting it to the vehicle. Thereafter, the axle support can be removed and the vehicle can be lowered. For example, this lifting column according to the present invention obviates the need for the use of a separate wheel dolly. This significantly reduces the number of steps that is required, thereby enabling a more effective repair and maintenance of vehicles. Furthermore, the working environment is rendered safer due to the limited number of required equipment and load shifts.

Vehicles are usually lifting with a number of lifting columns. Each of these lifting columns is designed to carry their respective load. Preferably, each of the masts of an individual lifting column is designed to carry this respective part of the vehicle load. This further increases safety when lifting vehicles with a number of lifting columns, especially in case of a failure in the drive of one of the masts. Optionally, an individual mast is designed to carry the respective load for the individual lifting column and not necessarily lift the vehicle in case of a failure or emergency. More specifically, an individual mast is designed to carry the so-called rated load of the lifting column.

In a presently preferred embodiment of the invention the first and second masts are symmetrically positioned on the frame. Positioning the masts symmetrically relative to the wheel access guarantees a safe support for the vehicle and/or vehicle parts. The substantially symmetrical design provides a safe load support reducing the risk of the lifting column bending or even collapsing with the risk of a vehicle falling from one of the carriers.

Preferably, the lifting column is designed such that the load acts on the carrier substantially in the center between the first and second masts. Such design contributes to stabilizing the load on the lifting column or lifting columns. Providing the load substantially in the center between the first and second mast enables a distribution of the forces acting on the lifting column in an effective and efficient manner over the first and second masts. This further contributes to a safe working environment.

In a preferred embodiment of the invention the lifting column further comprises a side-shift mechanism.

Providing the lifting column with the side-shift mechanism enables side-shifting the carrier, preferably the carrying part(s) thereof, thereby enabling (re)positioning of the carrier relative to the vehicle and vehicle parts without a required movement of the lifting column as a whole. This improves the alignment of especially the carrier and carrying part thereof relative to the vehicle. This enables an effective and efficient lifting operation. In a presently preferred embodiment to the carrying part comprises two fork parts that engage the vehicle wheel. The side-shift mechanism preferably moves these fork parts in a direction that is substantially parallel to the vehicle length to enable alignment of the fork parts with the wheel, specifically the wheel axle.

In a further preferred embodiment of the invention the lifting column comprises a positioning mechanism.

The positioning mechanism enables movement of the carrier part such that the carrier is configured for engaging different wheel diameters. In case the carrier part comprises two fork parts the distance between the individual fork parts can be increased or decreased to enable handling of different wheel diameters. This improves the flexibility of the lifting column for lifting different vehicle types.

In a further preferred embodiment of the invention the lifting column further comprises a tilting mechanism.

The tilting mechanism enables tilting the carrier relative to the workshop floor. This improves safety when working with the lifting system. For example, after dismounting a vehicle wheel from the vehicle the tilting mechanism can be activated to tilt the carrier over a tilting angle to center and align the rim of the wheel with the wheel hub on the axle. This enables a correct connection and/or removal of vehicle parts and/or reduction of frictional forces when working on a vehicle. Also, this tilting mechanism improves safety of working on a vehicle. In addition, the tilting mechanism may have a stabilizing effect on vehicle parts that are carries with the carrier, such as a wheel. This improves the safety when working with the lifting column. The tilting angle is preferably in the range of 1-8°. The actual tilting angle may depend on the vehicle type, for example.

In a further preferred embodiment of the invention the carrier of the lifting column comprises a wheel rotational adjuster.

The wheel rotational adjuster enables rotation of the wheel during the lifting operation, also in a position wherein the vehicle is at a height above the workshop floor. Adjusting the rotational position of the wheel enables alignment of the studs on the hub with the bolt holes in the rim. This has advantages for the operator/mechanic that requires access to these vehicle parts. Preferably, the adjuster comprises rotational engagement means that can be manually driven or may involve the use of an adjustment drive.

Optionally, the wheel rotational adjuster is a roller that is capable of carrying the vehicle or vehicle part, and acts as fork part. Such roller enables a vehicle wheel to rotate when the vehicle is being lifted. This provides additional flexibility for the operator and/or prevents that due to unexpected rotation of the wheel the stability of the lifting column can be influenced.

In a further preferred embodiment of the invention the lifting column comprises a locking mechanism configured for locking a wheel and/or components of a wheel assembly and/or other vehicle part(s) to the carrier and/or frame of the lifting column.

Providing a locking mechanism enables locking of a wheel and/or components of a wheel assembly and/or other vehicle part(s) after dismounting from the vehicle and/or when being provided to the vehicle that is lifted. This enables a safe lifting and/or lowering and/or movement of these parts. The locking mechanism may use a hook, pawl, catch, other suitable mechanical locking means and/or other suitable means including magnets such as magnets including permanent magnets. It will be understood that other suitable locking mechanisms can also be envisaged according to the invention.

In a further preferred embodiment of the invention the lifting column comprises a controller that is configured for controlling movements and/or settings of the lifting column.

The controller preferably comprises a memory for storing settings and positions of a wheel relative to the vehicle and/or lifting column. Optionally, this involves setting sideshift, positioner tilting and/or locking mechanism(s), and/or other parts of the lifting column such as a wheel rotational adjuster. This may also include the actual position of the wheel bolts. Storing the actual position of the wheel bolts can be interesting when replacing a wheel. The position of the wheel bolts can be manipulated and preferably recognized, as well as the position of other parts of a wheel such as an air valve. When the new wheel has been positioned the wheel adjuster may rotate a wheel such that the wheel bolts can be mounted effectively and relatively fast.

In a further preferred embodiment of the invention the lifting column comprises an electrical drive for moving the lifting column.

Providing an electrical drive enables replacing the lifting column automatically and/or without the requirement of significant manual labor. Movements of the lifting column are required when positioning the lifting column relative to the vehicle and/or when removing vehicle parts from the vehicle and/or collecting replacement parts.

In a further preferred embodiment of the invention the carrier and/or part of the carrier of the lifting column comprises a release-mechanism configured for releasing the carrier and/or part of the carrier from the mast.

Providing a release-mechanism enables fast release of the carrier and/or part of the carrier from the mast, more specifically from the first and second masts, thereby enabling the lifting column to store parts with the carrier and/or part of the carrier and allowing an effective and efficient collection of replacement parts. Optionally, replacement parts are stored with their own carrier and/or part of the carrier. This also enables to dedicate the carrier and/or part of the carrier towards the specific vehicle part to further improve safety and efficiency.

In a further preferred embodiment of the invention the lifting column further comprises a tool arm configured for carrying a tool.

Providing the lifting column with a tool arm enables the lifting column to effectively carry and/or hold a tool, such as an air gun. The tool arm enables an operator to position the tool effectively. Optionally, the lifting column comprises at least one battery, and wherein in use the battery is operatively connected to the tool for driving the tool, such that the one or more batteries act as tool drive. This provides an efficient tool, such as an air gun, to an operator of the lifting column.

The invention further relates to a lifting column for lifting a vehicle, wherein the lifting column comprises:
  a frame provided with a mast;
  at least one carrier configured for engaging the vehicle, wherein the at least one carrier is moveable relative to the mast, and wherein the carrier comprises two or more fork parts; and
  a lifting mechanism with a drive for moving the at least one carrier and lifting the vehicle, wherein the carrier comprises a wheel rotational adjuster that is configured as fork part.

This lifting column provides the same or similar effects and/or advantages as described earlier for the lifting column with a first and second mast. Optionally, the wheel rotational adjuster is a roller that is capable of carrying the vehicle or vehicle part, and acts as fork part. Such roller enables a vehicle wheel to rotate when the vehicle is being lifted. This provides additional flexibility for the operator and/or prevents that due to unexpected rotation of the wheel the stability of the lifting column can be influenced.

The invention further relates to a lifting column for lifting a vehicle, wherein the lifting column comprises:
  a frame provided with a mast;
  at least one carrier configured for engaging the vehicle, wherein the at least one carrier is moveable relative to the mast;
  a lifting mechanism with a drive for moving the at least one carrier and lifting the vehicle;
  one or more batteries for providing power to the lifting column and its components;
  a tool arm that can be provided with a tool configured for performing operations on the vehicle,
  wherein in use the one or more batteries can be operatively connected to the tool for driving the tool, such that the one or more batteries act as tool drive.

This lifting column provides the same or similar effects and/or advantages as described earlier for the lifting column with a first and second mast and/or the lifting column with the wheel rotational adjuster. Optionally, also the lifting column with the tool arm comprises such first and second mast, wherein the first and second mast are positioned on the frame at a mast distance, and wherein the mast distance enables access to the wheel. Also, one or more of the other components that are described earlier can be applied in combination with the tool arm.

The invention further relates to a lifting system for lifting a vehicle, the lifting system comprises at least one lifting column as described herein.

The lifting system provides the same or similar effects and/or advantages as described for the lifting column, more specifically the mobile lifting column. Optionally, the individual lifting columns can be controlled by a central controller of the lifting system. A number of lifting columns can be grouped together as a lifting system. In an embodiment of such lifting system according to the invention at least two lifting columns are being used for lifting the vehicle. In fact, mostly four or even more lifting columns will be grouped together in a lifting system. This grouping can be permanent or flexible. During the lifting operation movement of the individual carriers is controlled by the controller involving synchronization of these movements. In case one of the carriers has moved too fast in the ascent mode and is too high as compared to other carriers of the other lifting columns, in one of the embodiments of the invention the power supply to this carrier is either directly or indirectly lowered such that the other carriers can catch up. Alternatively, the power supply to the other carriers is either directly or indirectly increased such that the other carriers can catch up. In the descent mode power supply is increased for a carrier that has moved too slowly to enable this carrier to catch up with the other carriers. Alternatively, the power supply to the other carriers is either directly or indirectly lowered so that the carrier can catch up.

Optionally, the lifting system comprises one or more axle supports.

The invention further also relates to a method for lifting a vehicle, wherein the method comprises the steps of:
  providing a lifting system with at least one lifting column as described herein,
  positioning the lifting column relative to the vehicle, and;
  lifting the vehicle.

Such method provides the same effects and/or advantages as described for the lifting column(s) and/or the lifting system.

The lifting operation includes an ascending and descending movement of the vehicle. Optionally, the method comprises the steps of positioning the carrier relative to the vehicle involving the side-shift mechanism, positioner mechanism, tilting mechanism, locking mechanism and/or wheel rotational adjuster, or other suitable means. Preferably, maintenance is performed optionally including removal of a wheel and/or components of a wheel assembly such as a brake drum or wheel hub motor. This may involve the use of an axle support. Preferably, an electrical drive is provided to the lifting column to enable movement of the vehicle parts, preferably together with the locking mechanism and/or release—mechanism for the carrier.

It is noted that features mentioned in relation to the column and/or system can also be applied to the method, and vice versa.

The invention further also relates to a wheel trolley configured for carrying vehicle parts, wherein the wheel trolley comprises a wheel carrier frame configured for carrying a number of wheels, and having wheels for maneuvering the wheel trolley relative to a lifting column.

Such wheel trolley provides the same effects and/or advantages as described for the lifting column(s) and/or the lifting system and/or the method. Preferably, the wheel trolley is configured for carrying multiple wheels, such as four or six. In a presently preferred embodiment the wheels can be positioned on a support shaft of the trolley. Also in a preferred embodiment an engagement member is provided that is configured to move the wheels, or other vehicle components, relative to the carrier frame. Preferably, the trolley comprises an electrical drive and/or a remote control.

The trolley provides an effective means to transport vehicle parts to and/or from the vehicle and lifting system that preferably comprises a number of lifting columns. Preferably the trolley is capable of being maneuvered between the forks of the carrier, and preferably fits between the separate masts of a lifting column according to the present invention. This provides an effective approach to pick up parts from the trolley by a lifting column, for example. In combination with providing a lifting column with a rotational adjuster an effective combination of lifting column/system with trolley is achieved.

BRIEF DESCRIPTION OF THE DRAWINGS

Further advantages, features and details of the invention will be elucidated on the basis of preferred embodiments thereof, wherein reference is made to the accompanying drawings in which:

FIG. 5 A shows a lifting column according to an alternative embodiment of the invention;

FIG. 5 B shows a multiple wheel trolley for cooperation with the lifting column of FIG. 5 A; and FIGS. 6 A-E shows stages of the multiple wheel trolley of FIG. 5 B.

DESCRIPTION OF THE INVENTION

The following description is merely exemplary in nature and is in no way intended to limit the invention, its application or users. While the disclosure is described as having exemplary attributes and applications, the present disclosure can be further modified. This application is therefore intended to cover any variations, users, and adaptations of the disclosure using its general principles. Further, this application is intended to cover such departures from the present disclosure as commonly known or customary practice of those skilled in the art to which this disclosure pertains and which fall within the limits of the appended claims. Accordingly, the following corruption of certain embodiments and examples should be considered merely exemplary and not in any way limiting.

A lifting column 2 (FIG. 1A-E) is positioned on workshop floor 4. Lifting column 2 comprises frame 6 having foot 8. In the illustrated embodiment, foot 8 is provided with a U-shaped frame comprising one or more wheels 10 that act as a running wheel. At the other end of foot 8 there is provided one or more steering wheels 12 that enables (easy) maneuvering of lifting column 2.

Figure 1A:
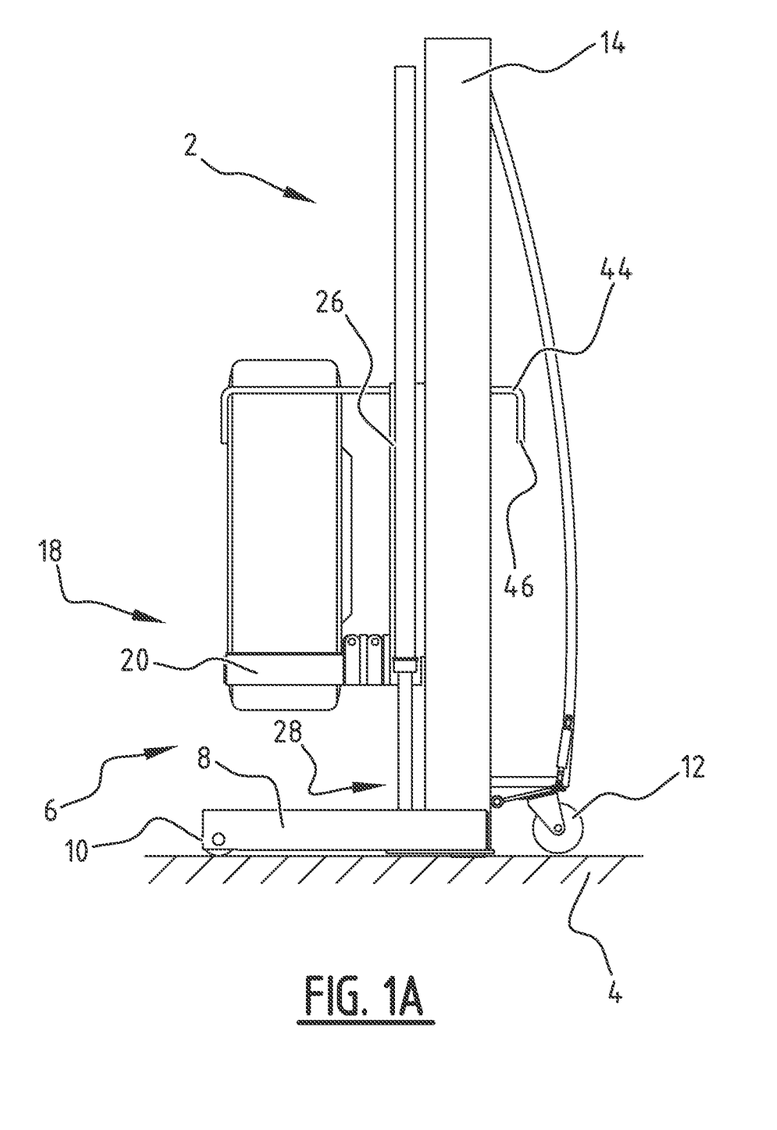
FIGS. 1A-E shows the lifting column according to an embodiment of the invention, FIG. IF shows a cutaway of the details of FIG. 1D.
Figure 1B:
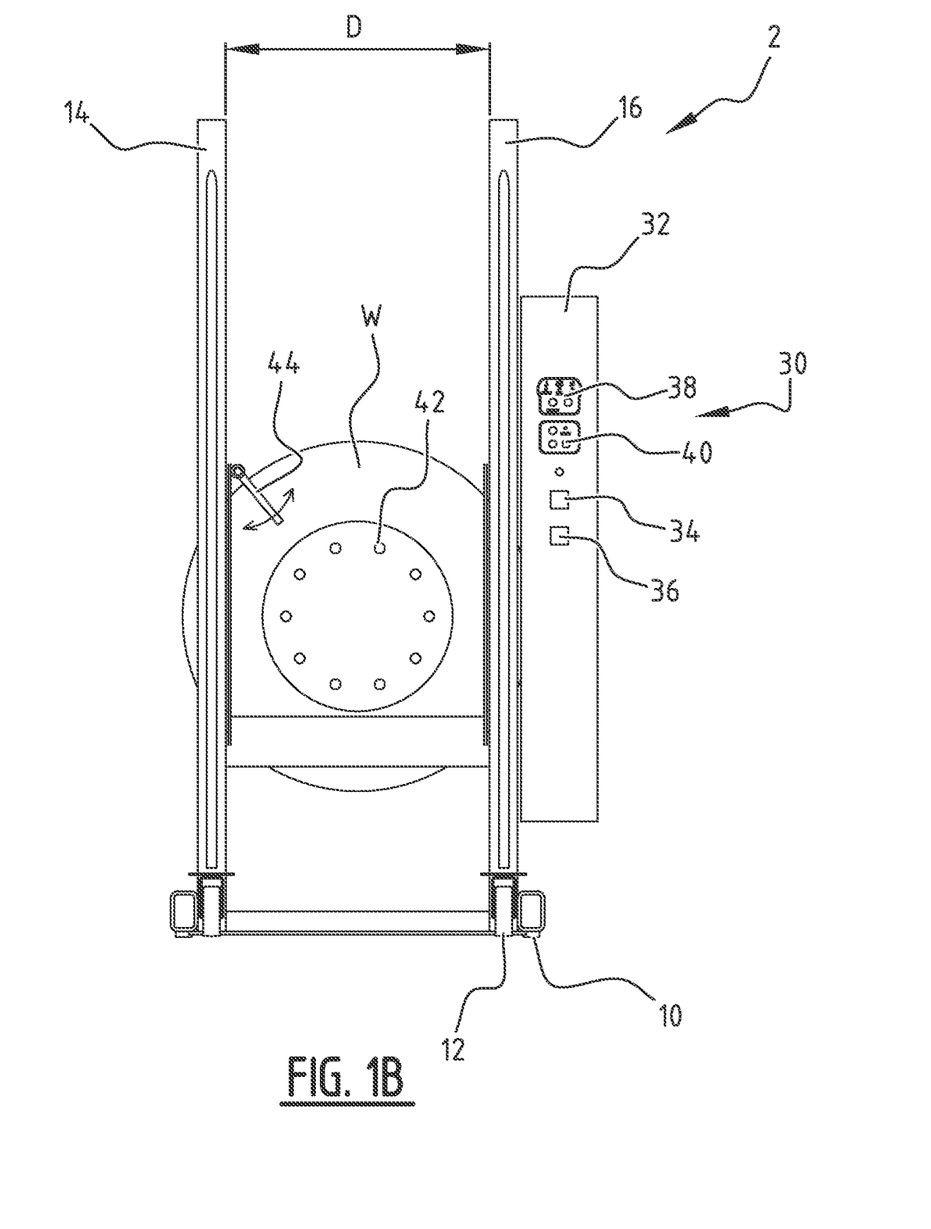
Figure 1C:
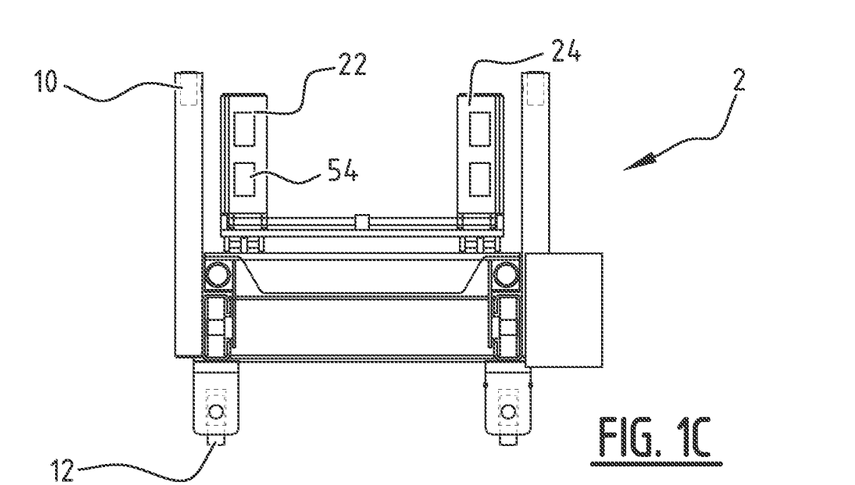

Lifting column 2 further comprises first mast 14 and second mast 16. Masts 14, 16 are provided at a relative distance to each other that is defined by the mast distance D. Mast distance D defines the opening between masts 14, 16 that enables access to a vehicle wheel, for example. Carrier 18 comprises carrying part 20 with first carrier fork 22 and second carrier fork 24. Carrier 18 further comprises carrier guide 26 enabling movement along masts 14, 16. Carrier 18 is moveable relative to masts 14, 16 using drive 28, such as a hydraulic cylinder. The carrying part 20 extends in a cantilevered fashion from the carrier guide 26. Drive 28 is controlled by controller 30. In the illustrated embodiment controller 30 is mounted in control cabinet 32 that is attached to the side of mast 16. Controller 30 is provided with memory 34 and processor 36 (schematically illustrated in FIG. 1B). Control cabinet 32 further comprises display 38 and user input 40 such as touch screen and/or buttons. Controller 30 enables actuating drive 28 for lifting or lowering carrier 18 with wheel W having a number of wheel bolts 42 (FIG. 1B).

In one of the embodiments of the invention, lifting column 2 further comprises locking mechanism 44 (FIG. 1A-B) that comprises a locking rod and handle 46. It will be understood that locking element 44 can also be embodied in alternative manners.

Figure 1D:
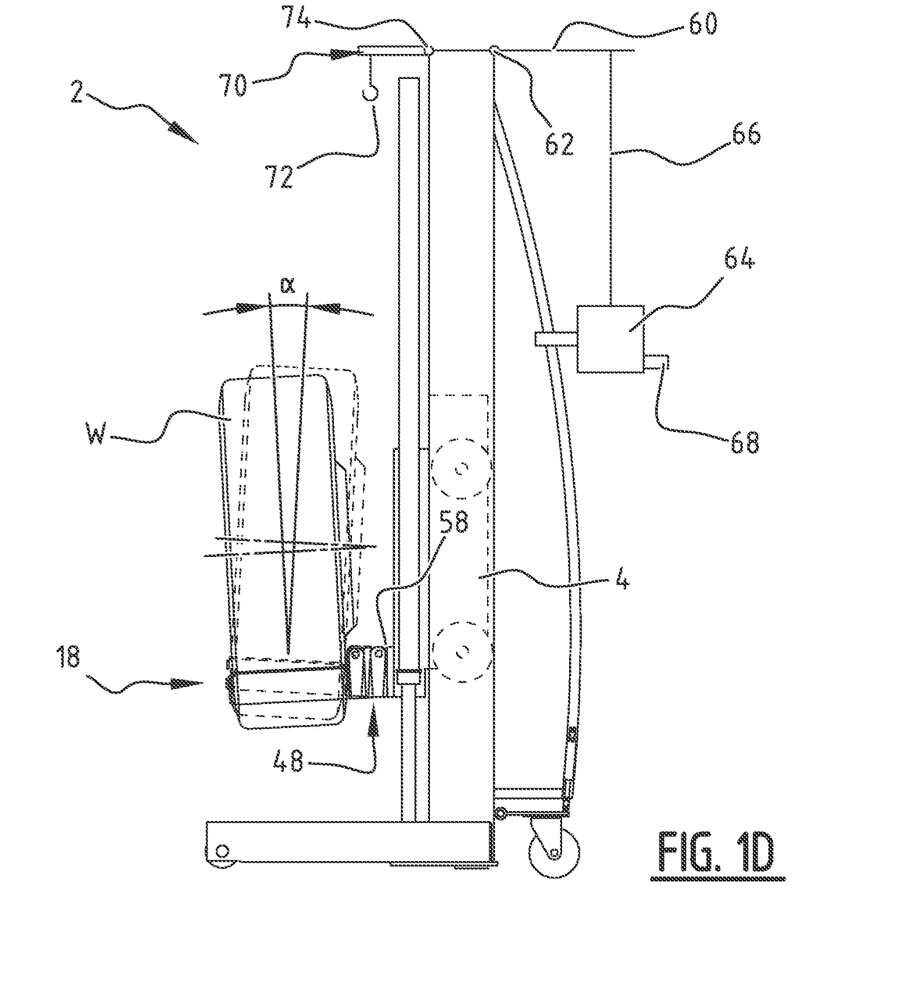
Figure 1E:
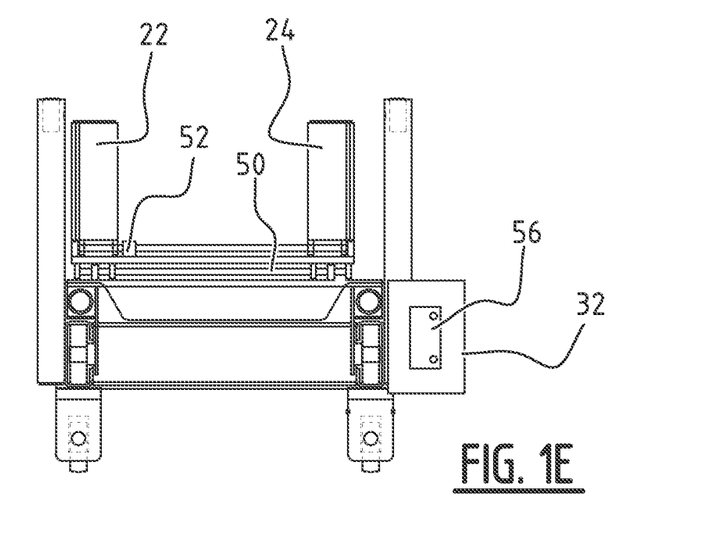
Figure 1F:
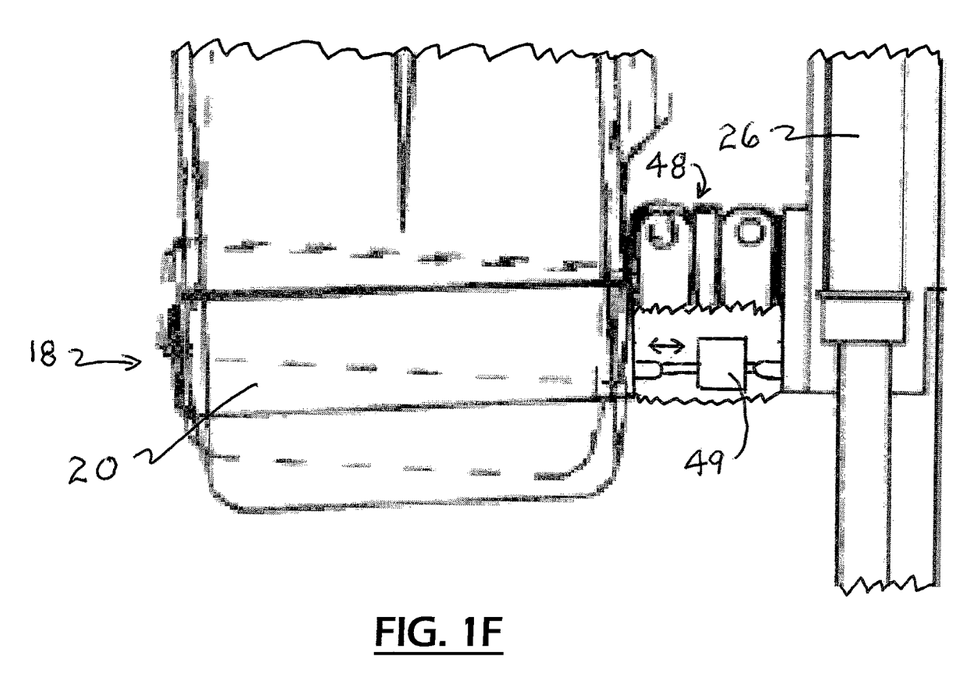

Tilting mechanism 48 (FIG. 1D) enables tilting carrier 18 around an axis that extends substantially parallel to the vehicle length during a lifting operation. The desired tilting angle α is provided by positioning tilting mechanism 48 (FIG. 1). In particular, each carrying part 20 may be hinged with respect to the carrier guide 26 to allow tilting of the carrying part 20 around the axis that extends substantially parallel to the vehicle during the lifting operation. FIG. 1F is a cutaway view of a portion of FIG. 1D showing a device 49 attached to the carrying part 20 and to the carrier guide 26 for tilting the carrying part 20. The device 49 may be any number of mechanisms known to those skilled in the art for imparting linear motion, such as a hydraulic piston or a power screw.

Side-shift mechanism 50 (FIG. 1E) enables joint movement of fork parts 22, 24 of carrier 18. Positioner mechanism 52 enables a movement of fork parts 22, 24 relative to each other (FIG. 1E) to enable adjustments for the size of the wheel diameter, for example.

In the illustrated embodiment wheel rotational adjuster 54 (FIG. 1C) enables rotation of the wheel during the lifting operation. In the illustrated embodiment wheel rotational adjuster 54 comprises a number of rollers that are optionally connected to a drive. Optionally, fork part(s) 22, 24 are embodied as wheel rotational adjuster 54. In other words, wheel rotational adjuster 54, such as a roller, acts also as fork part 22, 24.

Optionally, control cabinet 32 is provided with battery 56 (FIG. 1E) that can be used for lowering and/or lifting carrier 18, and also for controlling side-shift mechanism 50, positioner mechanism 52, wheel rotational adjuster 54, tilting mechanism 48, for example. Also optionally, battery 56 can be used for moving lifting column 2 over workshop floor 4. This movement of column 2 may comprise positioning of column 2 relative to the vehicle to be lifted and/or removing and/or providing spare vehicle parts. Furthermore, battery 56 can be used to power tool 64.

Lifting column 2 optionally comprises release mechanism 58 that connects carrier 18 to frame 4 such that carrier 18 can be easily removed from and/or connected to frame 4 of lifting column 2. This release mechanism 58 may involve the use of a bow, hook or bolts to enable a releasable mechanism.

In an optional embodiment of lifting column 2 there is provided tool arm 60 (FIG. 1D) that is connected to frame 4 with hinge 62 enabling rotation of tool arm 60. Preferably, tool arm 60 is provided with a balancer and is configured for carrying air gun 64 with one or more cables 66. Air gun 64 is preferably provided with a pneumatic connection 68 to power air gun 64. Tool arm 60 can be used to position air gun 64 relative to wheel W and is preferably capable of being stored sideways such that air gun 64 can be placed in an optional holder. It will be understood that other equipment can also be connected to the optional tool arm 60.

Furthermore, an optional feature lifting column 2 can be provided with crane arm 70 (FIG. 1D) and lifting hook 72. Preferably crane arm 70 is provided with hinge or swivel 74.

Figure 2:
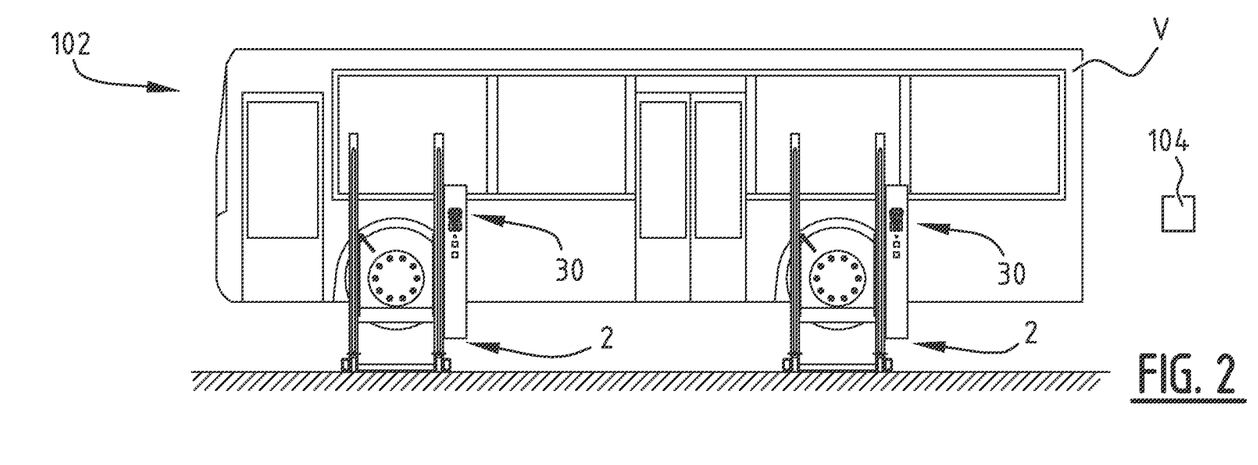
FIG. 2 shows a lifting system with a number of columns according to FIGS. 1-E when lifting a vehicle.

Lifting system 102 comprises a number of lifting columns 2 to enable lifting vehicle V (FIG. 2). Lifting system 102 can be controlled by one of the controllers 30 and/or a separate central controller 104.

When lifting vehicle V a number of lifting columns 2 is grouped together as lifting system 102. Lifting columns 2 are maneuvered relative to vehicle V. Optionally, side-shift mechanism 50 is used for further alignment of fork parts 22, 24 relative to wheel W of vehicle V by a joint movement of fork parts 22, 24. Also optional, positioner mechanism 52 is used to adjust carrier 18 to the actual wheel diameters. Therefore, when mounting or dismounting objects such as wheels, brake drums, brake pads, brake discs, batteries etc. lifting column 2 can be maneuvered into the correct position to enable optimal replacement and/or maintenance.

After engaging wheel W vehicle V can be lifted. An operator may access wheel W and its wheel bolts 42 through the opening defined by mast distance D between masts 14, 16. Axle support 106 (FIG. 3) is positioned to carry the load of vehicle V. After dismounting wheel W and/or vehicle part, carrier 18 is lowered to enable removal of the vehicle part from vehicle V. Optionally, tilting mechanism 48 is used and/or locking mechanism 44 to enable safe removal of the vehicle part, optionally further including the provision of a replacement part. Equipment, such as air gun 64, can be carried by tool arm 60. Also optional, tilting hook 72 can be activated to tilt vehicle parts.

Figure 3:
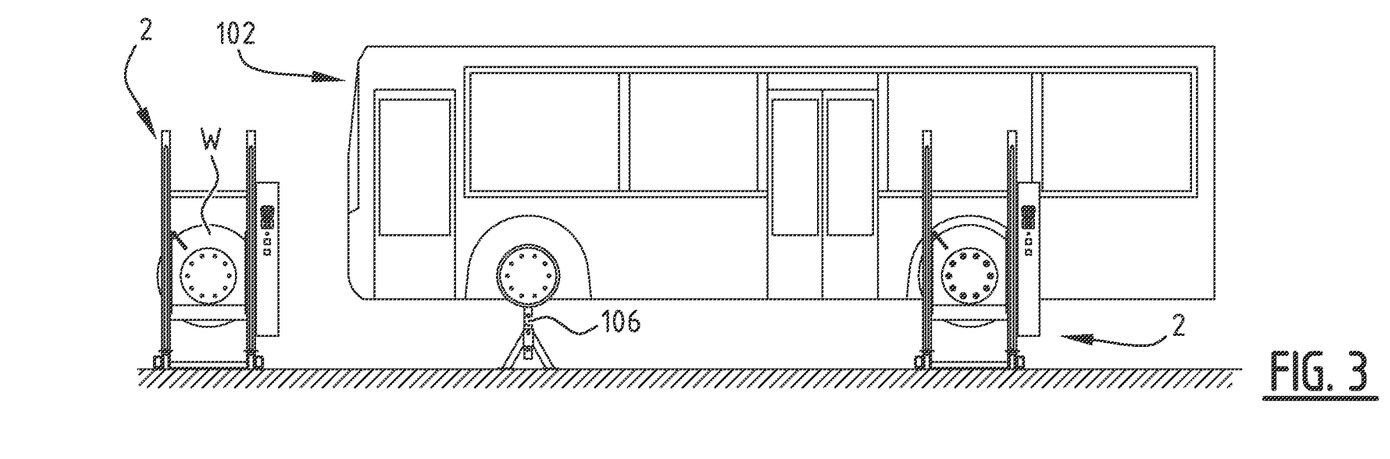
FIG. 3 shows the lifting system of FIG. 2 when one of the lifting columns is removed.

After mounting replacement parts and/or performing maintenance tasks axle support 104 is removed from the lifting system 102 and vehicle V can be lowered with lifting system 2.

Figure 4:
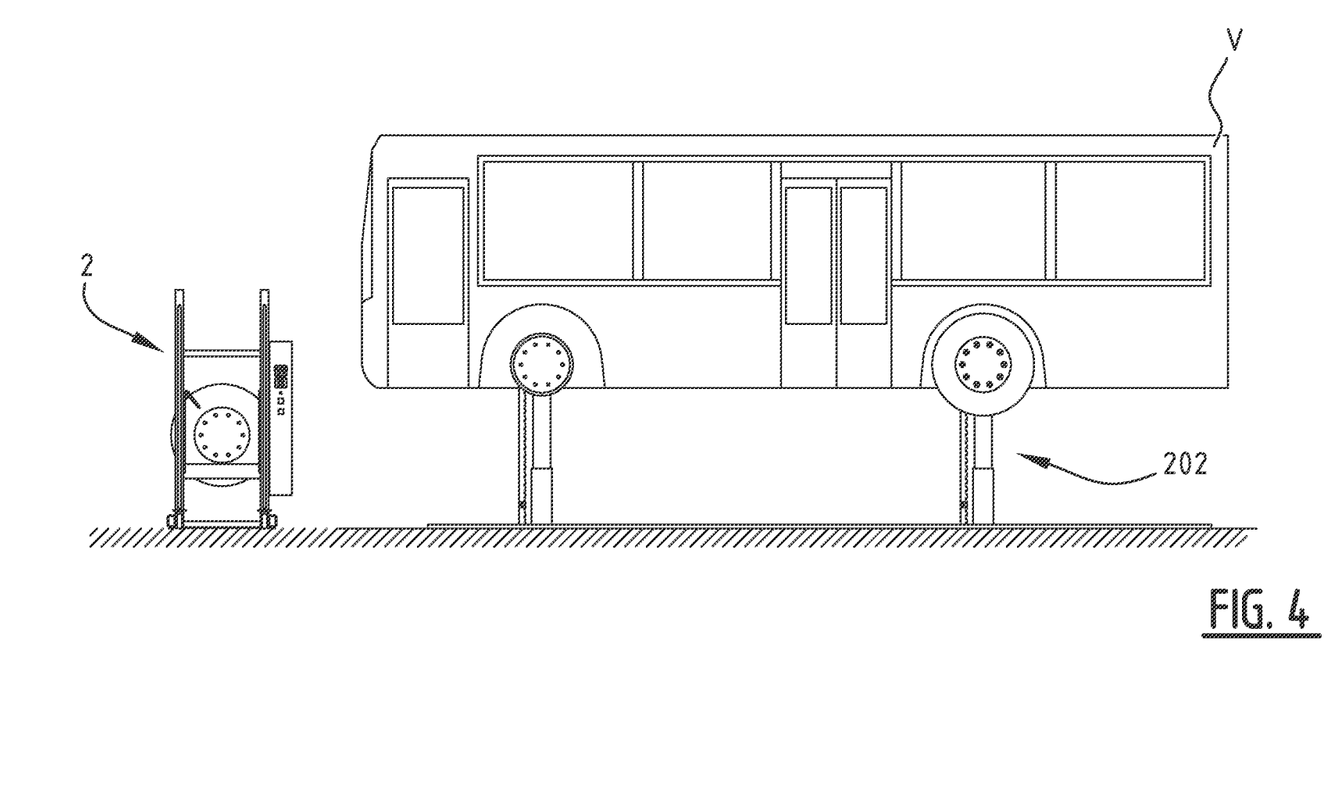
FIG. 4 shows the lifting column according to an embodiment of the invention in combination with an in-ground lift.

Lifting columns 2 can also be used in combination with other lifting systems, such as in-ground lifting system 202.

Figure 5A:
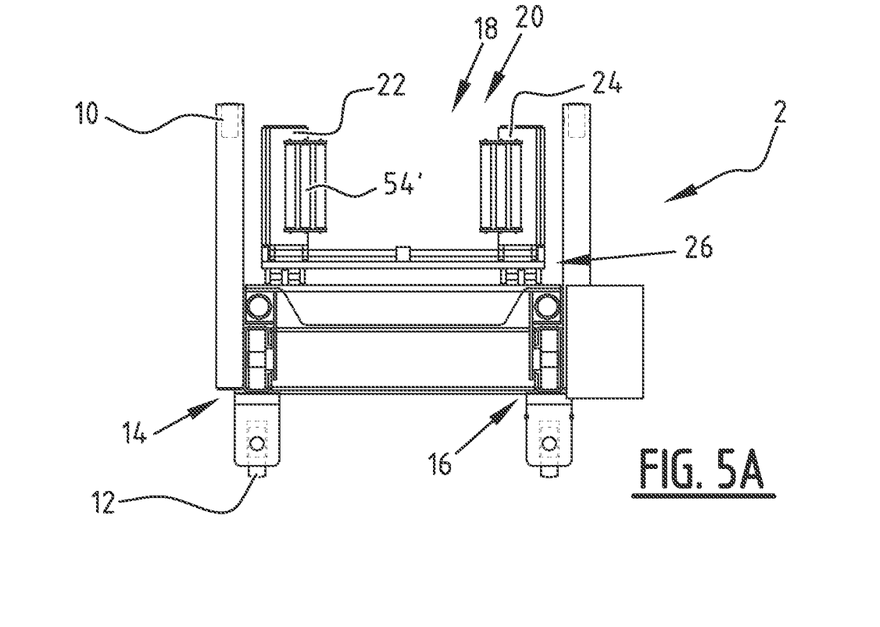

In an alternative embodiment (FIG. 5A) lifting column 2 comprises first mast 14, second mast 16, and a number of wheels 10, 12. Masts 14, 16 are provided at a relative distance to each other that is defined by the mast distance D. Mast distance D defines the opening between masts 14, 16 that enables access to a vehicle wheel, for example. Carrier 18 comprises carrying part 20 with first carrier fork 22 and second carrier fork 24. Carrier 18 further comprises carrier guide 26 enabling movement along masts 14, 16. In the illustrated embodiment wheel rotational adjuster 54' enables rotation of the wheel during the lifting operation. In the illustrated embodiment wheel rotational adjuster 54' comprises a number of rollers that extend over the length of forks 22, 24. Optionally, adjuster 54' comprises a number of rollers in parallel. Furthermore, optionally adjuster 54' is connected to a drive.

Figure 5B:
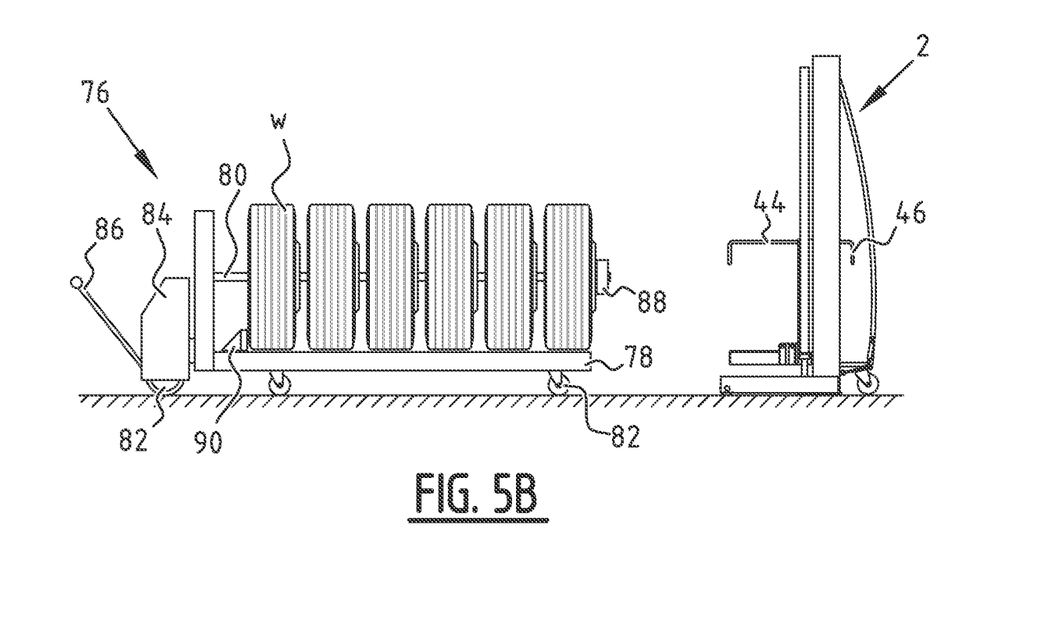
Figure 6A:
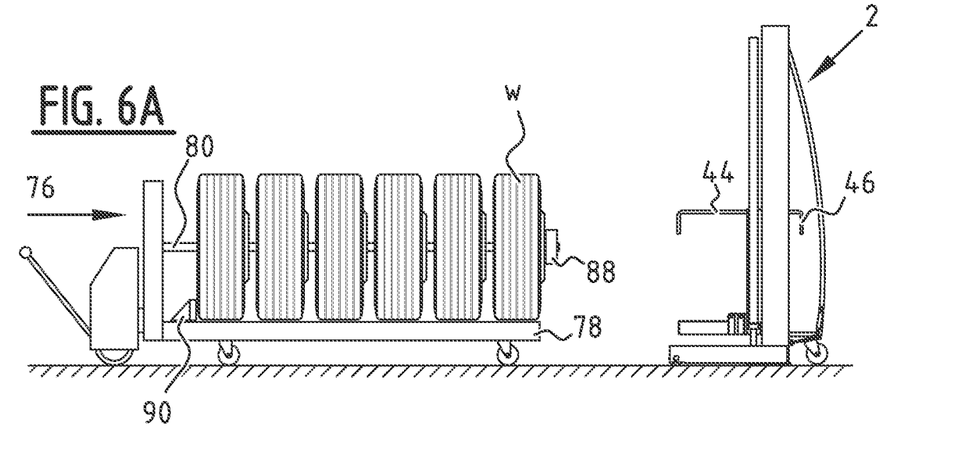
Figure 6B:
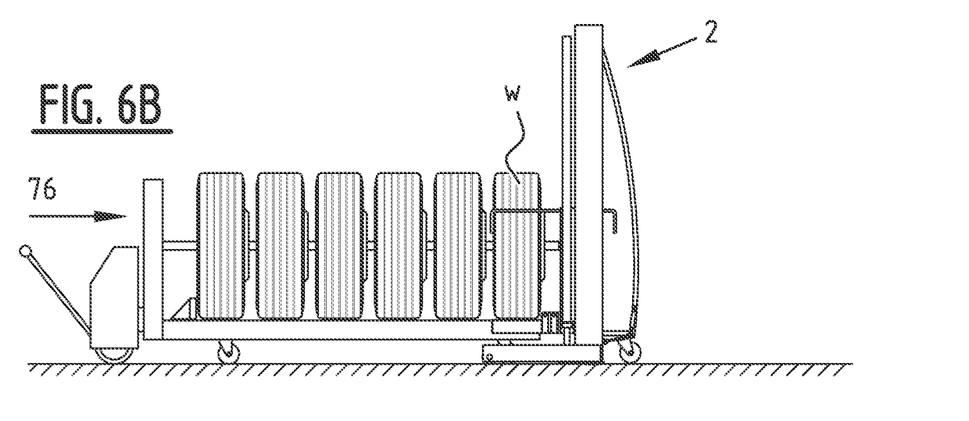
Figure 6C:
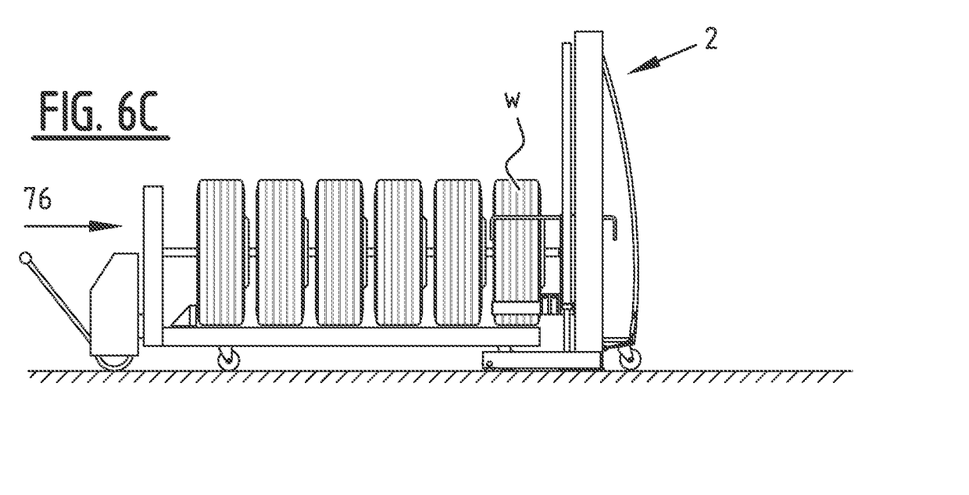
Figure 6D:
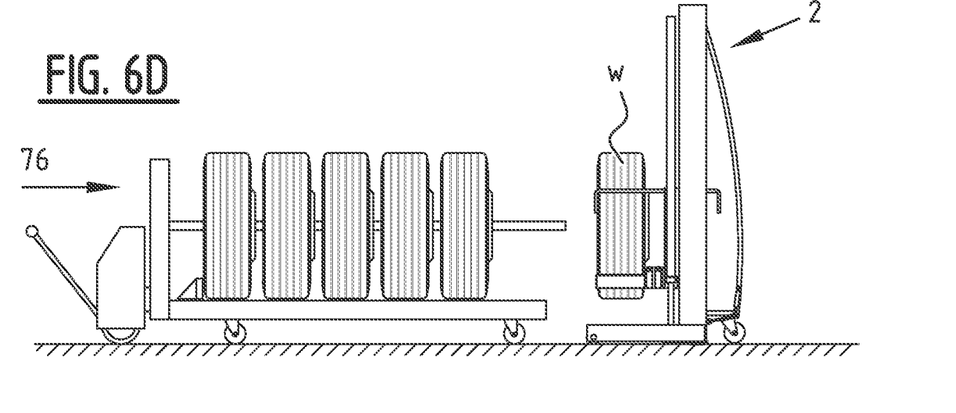
Figure 6E:
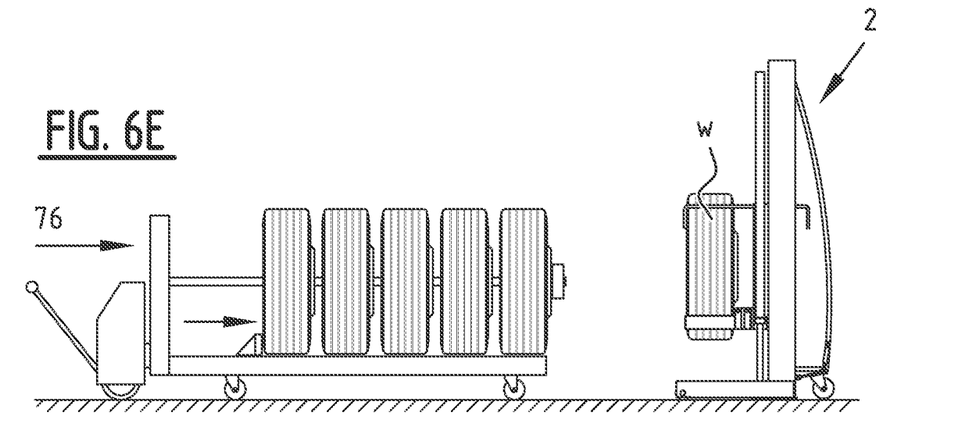

Multiple wheel trolley 76 (FIG. 5B) comprises wheel carrier frame 78, supporting shaft 80, wheels 82, frame 84, and handle 86. Supporting shaft 80 is provided with clamping element 88. Carrier frame 78 is capable of holding a number of wheels W. In the illustrated embodiment trolley 76 is configured for holding up to six wheels on shaft 80. In the illustrated embodiment wheel carrier frame 78 is provided with moveable engagement member 90 that is configured for moving wheels W relative to carrier frame 78 over shaft 80. Engagement member 90 is preferably hydraulically and/or electrically driven, optionally in combination with the drive of trolley 76. Lifting column 2 further comprises locking mechanism 44 that comprises a locking rod and handle 46.

The illustrated multiple wheel trolley 76 can be moved relative to lifting column 2 (FIG. 6B-E). In the illustrated embodiment trolley 76 can be maneuvered between masts 14, 16 of lifting column 2. Preferably, forks 22, 24 are capable of lifting wheel W from wheel carrier frame 78. Adjuster 54, 54' is capable of positioning wheel W correctly relative to the vehicle. Locking mechanism 44 can be used to maintain wheel W in a stable position. Engagement member 90 optionally moves remaining wheels W to the end of wheel carrier frame 78.

It will be understood that alternative embodiments of multiple wheel trolley 76 can be envisaged in accordance to the present invention. For example, trolley 76 can be configured for carrying a different number of wheels W such as one, two, four, or eight. Also, trolley 76 can be configured for carrying one or more carriers 18 or parts thereof, optionally with vehicle parts such as wheel W, wheel drive, batteries.

The present invention is by no means limited to the above described preferred embodiment thereof. The rights sought are defined by the following claims, within the scope of which many modifications can be envisaged.

The invention claimed is:

1. A lifting column for lifting a vehicle, comprising:
   a frame provided with a first mast and a second mast;
   at least one carrier configured for engaging the vehicle, wherein the at least one carrier is moveable relative to the first mast and the second mast and wherein each of the at least one carrier comprises a carrying part and wherein each carrying part extends in a cantilevered fashion from a carrier guide;
   a lifting mechanism with a drive for moving the at least one carrier and lifting the vehicle,
   wherein the first mast and the second mast are positioned on the frame at a mast distance, and wherein the mast distance enables access to a wheel of the vehicle; and
   wherein each carrying part is tiltable with respect to the carrier guide to allow tilting of the carrying part around an axis that extends substantially parallel to the vehicle during a lifting operation.

2. The lifting column according to claim 1, wherein the first and second masts are symmetrically positioned on the frame.

3. The lifting column according to claim 1, wherein in use the load on the carrier is substantially in the center between the first and second masts.

4. The lifting column according to claim 1, further comprising a side-shift mechanism.

5. The lifting column according to claim 1, further comprising a positioner mechanism.

6. The lifting column according to claim 1, wherein the carrier comprises a wheel rotational adjuster.

7. The lifting column according to claim 6, wherein the wheel rotational adjuster comprises a roller that is configured for acting as a fork part of the carrier.

8. The lifting column according to claim 1, further comprising a locking mechanism configured for locking a wheel and/or components of a wheel assembly to the carrier or frame.

9. The lifting column according to claim 1, further comprising a controller configured for controlling movements and/or settings of the lifting column.

10. The lifting column according to claim 1, further comprising an electrical drive for moving the lifting column.

11. The lifting column according to claim 1, wherein the carrier and/or part of the carrier comprises a release-mechanism configured for releasing the carrier and/or part of the carrier from the mast.

12. The lifting column according to claim 1, further comprising a tool arm configured for carrying a tool.

13. The lifting column according to claim 12, wherein the lifting column comprises at least one battery, and wherein in use the battery is operatively connected to the tool for driving the tool.

14. A method for lifting a vehicle, comprising the steps of:
providing a lifting system with at least one lifting column according to claim 1;
positioning the lifting column relative to the vehicle; and
lifting the vehicle.

15. The method according to claim 14, further comprising the step of performing maintenance with removing a wheel and/or components of a wheel assembly.

16. A lifting column for lifting a vehicle, wherein the lifting column comprises:
a frame provided with a mast;
at least one carrier configured for engaging the vehicle, wherein the at least one carrier is moveable relative to the mast and wherein each of the at least one comprises a carrying part and wherein each carrying part extends in a cantilevered fashion from a carrier guide;
a lifting mechanism with a drive for moving the at least one carrier and lifting the vehicle;
one or more batteries for providing power to the lifting column and its components; and
a tool arm that can be provided with a tool configured for performing operations on the vehicle,
wherein in use the one or more batteries can be operatively connected to the tool for driving the tool, such that the one or more batteries act as tool drive; and
wherein each carrying part is tiltable with respect to the carrier guide to allow tilting of the carrying part around an axis that extends substantially parallel to the vehicle during a lifting operation.

17. The lifting column according to claim 1, wherein the carrier comprises a wheel rotational adjuster.

18. The lifting column according to claim 17, further comprising a tool arm configured for carrying a tool.

* * * * *

UNITED STATES PATENT AND TRADEMARK OFFICE
CERTIFICATE OF CORRECTION

| | | |
|---|---|---|
| PATENT NO. | : 11,780,716 B2 | Page 1 of 1 |
| APPLICATION NO. | : 17/244074 | |
| DATED | : October 10, 2023 | |
| INVENTOR(S) | : Albert Thaeke Russchen et al. | |

It is certified that error appears in the above-identified patent and that said Letters Patent is hereby corrected as shown below:

In the Specification

Column 1, Lines 12-13, delete "U.S. Pat. No. 2,026,109" and insert -- 2026109 --

Signed and Sealed this
Twelfth Day of December, 2023

*Katherine Kelly Vidal*

Katherine Kelly Vidal
*Director of the United States Patent and Trademark Office*